(12) United States Patent
Gauthier

(10) Patent No.: US 10,805,025 B2
(45) Date of Patent: Oct. 13, 2020

(54) METHOD AND SYSTEM FOR EVALUATING SIGNAL PROPAGATION OVER A RADIO CHANNEL

(71) Applicant: OCTAVE COMMUNICATIONS, Granby (CA)

(72) Inventor: Francois O. Gauthier, Granby (CA)

(73) Assignee: OCTAVE COMMUNICATIONS, Granby (CA)

( * ) Notice: Subject to any disclaimer, the term of this patent is extended or adjusted under 35 U.S.C. 154(b) by 87 days.

(21) Appl. No.: 16/133,492

(22) Filed: Sep. 17, 2018

(65) Prior Publication Data
US 2020/0092020 A1  Mar. 19, 2020

(51) Int. Cl.
*H04B 17/391* (2015.01)
*H04B 17/373* (2015.01)
*H04B 17/309* (2015.01)
*G01S 19/05* (2010.01)

(52) U.S. Cl.
CPC .......... *H04B 17/3913* (2015.01); *G01S 19/05* (2013.01); *H04B 17/309* (2015.01); *H04B 17/373* (2015.01)

(58) Field of Classification Search
CPC combination set(s) only.
See application file for complete search history.

(56) References Cited

U.S. PATENT DOCUMENTS

| | | | | |
|---|---|---|---|---|
| 9,832,007 | B2* | 11/2017 | Kroeger | H04H 20/30 |
| 2006/0125692 | A1* | 6/2006 | Wang | G01S 5/0252 |
| | | | | 342/451 |
| 2007/0021915 | A1* | 1/2007 | Breed | B60N 2/2863 |
| | | | | 701/301 |
| 2010/0145615 | A1* | 6/2010 | McCrank | H04H 60/51 |
| | | | | 701/469 |
| 2016/0302093 | A1* | 10/2016 | Fuller | H04H 20/12 |
| 2017/0285131 | A1* | 10/2017 | Hsu | G01S 5/10 |
| 2017/0302432 | A1* | 10/2017 | Kroeger | H04H 20/30 |
| 2018/0070363 | A1* | 3/2018 | Chakraborty | H04B 17/318 |
| 2019/0025434 | A1* | 1/2019 | Takeda | G01S 19/04 |

* cited by examiner

*Primary Examiner* — Yee F Lam
(74) *Attorney, Agent, or Firm* — BCF LLP

(57) ABSTRACT

The present disclosure relates to a method and a mobile system for evaluating signal propagation over a radio channel. Predicted values for the radio channel are acquired at the mobile system, the predicted values being distributed over a geographical area. The mobile system follows a test route defined within the geographical area, the test route including a plurality of measurement points distributed over the geographical area. For each measurement point, the mobile system acquires one or more metrics on the radio channel and compares each of the one or more metrics with a corresponding predicted value. The mobile system evaluates a radiation pattern of an antenna transmitting on the radio channel based on the comparisons. The mobile system may produce a graph of the antenna radiation pattern and maps showing the acquired metrics on the geographical area.

18 Claims, 12 Drawing Sheets

METHOD AND SYSTEM FOR EVALUATING SIGNAL PROPAGATION OVER A RADIO CHANNEL

TECHNICAL FIELD

The present disclosure relates to the field of broadcast radio signal evaluation. More specifically, the present disclosure relates to a method and a system for evaluating signal propagation over a radio channel.

BACKGROUND

Broadcasting of commercial radio in digital formats is becoming prevalent in various parts of the world, including for example North America and Europe. Europe uses a standard named Digital Audio Broadcasting (DAB). North American radio stations operate using a standard called National Radio Systems Committee version 5-D (NRSC-5-D). Although proprietary, the name HD Radio™, in which the letters 'HD' stand for 'hybrid digital', is commonly used in the industry to refer to the NRSC-5-D standard.

FIG. 1 (Prior Art) is a National Radio Systems Committee (NRSC) reference model for a hybrid mode broadcast radio system. A radio station 100 operating according to this reference model has a main program service (MPS) audio signal 102 that can at once follow an analog path 104 and a digital path 106. Digital treatment of the MPS audio signal 102 adds delays, so the analog path 104 may optionally include a delay node 108 that delays the MPS audio signal 102 on the analog path 104 so that both the analog and digital versions of the MPS audio signal 102 will be substantially synchronized when transmitted.

The digital path 106 includes an audio subsystem 110 that encodes and compresses the MPS audio signal 102. The encoded and compressed MPS audio signal becomes a first input to a transport and service multiplex subsystem 112, being received in that subsystem 112 at an audio transport module 114. MPS data 116 that may comprise, for example, a name of the radio station 100, a name of an ongoing radio program, and the like. The MPS data 116 is a second input to the transport and service multiplex subsystem 112, being received at a program service data (PSD) transport module 118 that forwards the MPS data 116 to the audio transport module 114 for combining with the encoded and compressed MPS audio signal before applying to the transport and service multiplex subsystem 112.

The radio station 100 may broadcast one or more additional audio signals, for example a supplemental program service (SPS) audio signal 120. That may be the case for example when it is desired to transmit the MPS audio signal 102 in analog format only and use a digital bandwidth to transmit the SPS audio signal 120. The SPS audio signal 120 is encoded and compressed by another instance of the audio subsystem 110 and the encoded and compressed SPS audio signal becomes another input to the transport and service multiplex subsystem 112, being received another instance of the audio transport module 114. Likewise, SPS data 122 is received at another instance of the PSD transport module 118 for combining at the audio transport module 114 with the encoded and compressed SPS audio signal. Additional inputs to the transport and service multiplex subsystem 112 may comprise station information service (SIS) data and advanced data services data, these additional inputs having no particular relevance to the present disclosure.

All inputs to the transport and service multiplex subsystem 112 are multiplexed by a multiplexer 123 to become a combined digital signal 124 that is applied to a radio frequency (RF) transmission subsystem 126. In the RF transmission subsystem 126, a channel coding module 128 applied forward error correction (FEC) to the combined digital signal 124. A modulator 130 applies frequency modulation (FM) to the MPS audio signal 102 received from the analog path 104 and adds a differential binary phase shift keying (DBPSK) modulation and/or a quadrature phase shift keying (QPSK) modulation to the combined digital signal 124 on which FEC has been applied. An antenna 132 transmits the modulated signals. Generally, a power amplifier (not shown) is present between the modulator 130 and the antenna 132 for providing good coverage of the signals emitted by the radio station 100. The antenna 132 may be omnidirectional, or may have a transmission pattern that has variable gains over variable azimuth, in according with an operational license of the radio station 100. A receiver 134, which usually is a consumer device, receives and decodes the signals emitted by the radio station 100, provided it is within coverage of the antenna 132.

FIG. 2 (Prior Art) is a standard radio emission mask for hybrid mode broadcast radio. On FIG. 2, a radio emission mask 140 shows, on a horizontal axis 142, a frequency offset in KHz from a center frequency of a radio channel and, on a vertical axis 144, an attenuation in dB from a nominal allowed transmitted power for the radio channel. A curve 146 shows a hybrid or extension hybrid noise and emission limit for the radio channel. A curve 148 shows a nominal analog carrier power spectral density—it will be noted that the curve 148 extends to 100 KHz on either sides of the center frequency for the radio channel and thus occupies a bandwidth of 200 KHz, as in the case of a traditional FM radio channel in North America. Curves 150 and 152 respectively illustrated nominal digital carrier power spectral densities for a lower digital sideband and for a upper digital sideband of the radio channel. Each of the lower and upper digital sidebands occupies a 100 KHz bandwidth and has a lower spectral density than the analog carrier. In the particular example of FIG. 2, the upper digital sideband has power level illustrated by curve 152 that is lower than allowed by the emission limit of curve 146. This may represent an operational condition in which the power of the upper sideband is reduced to limit adjacent channel interference on another channel spaced 200 KHz away from the central frequency.

Radio signals that comply with the NRSC-5-D standard or with other standards used in markets outside of North America are complex and contain information modulated in various modes. These signals, like any other radio signals, are subject to various propagation issues such as, for example, log-normal fading, Rayleigh fading, same channel interference, adjacent channel interference, and the like. In part because of their hybrid nature of their content including digitized audio and alphanumeric information, reception quality of these signals may vary in many ways, as in the case for instance when analog audio quality is fair while MPS data starts being no longer decodable.

Until now, no convenient solution has been proposed to monitor and evaluate the quality of signals propagating over a radio channel. Radio broadcasting is generally meant to provide quality signals over a large geographical area, over varying terrains that may include hills, mountains, and large buildings, as well as rivers and lakes. It would therefore not be effective or economical to provide a solution that could only evaluate reception quality at a fixed location.

Therefore, there is a need for improvements in techniques used to evaluate the quality of signal propagation over a radio channel, in particular where these signals carry hybrid digital radio signals.

SUMMARY

According to the present disclosure, there is provided a method for evaluating signal propagation over a radio channel. Predicted values for the radio channel are acquired, the predicted values being distributed over a geographical area. A test route defined within the geographical area is followed. The test route includes a plurality of measurement points distributed over the geographical area. For each measurement point, one or more metrics on the radio channel are acquired and each of the one or more metrics is compared with a corresponding predicted value. A radiation pattern of an antenna transmitting on the radio channel is evaluated based on the comparisons.

According to the present disclosure, there is also provided a mobile system for evaluating signal propagation over a radio channel on a test route followed by the mobile system, the test route including a plurality of measurement points distributed over a geographical area. The mobile system comprises a memory device, a signal analyzer and a processor. The memory device is adapted to store predicted values for the radio channel, the predicted values being distributed over the geographical area. The signal analyzer is adapted to receive a signal on the radio channel and to acquire one or more metrics of the signal at each of the plurality of measurement points. The processor is operatively connected to the memory device and to the signal analyzer. The processor is adapted to compare each of the one or more metrics with a corresponding predicted value for each measurement point. The processor is also adapted to evaluate a radiation pattern of an antenna transmitting on the radio channel based on the comparisons.

The present disclosure further relates to a mobile system for evaluating signal propagation over a plurality of radio channels on a test route followed by the mobile system, the test route including a plurality of measurement points distributed over a geographical area. The mobile system comprises a memory device, one or more receivers and a processor. The memory device is adapted to store predicted values for each of the plurality of radio channels, the predicted values being distributed over the geographical area. Each receiver is adapted to receive a signal on a corresponding one of the plurality of radio channels. The processor is operatively connected to the memory device and to each of the one or more receivers. The processor is adapted to compare each of the one or more metrics with a corresponding predicted value for each measurement point and for each of the plurality of radio channels. The processor is also adapted to evaluate a radiation pattern of an antenna transmitting on each of the radio channels based on the comparisons.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems of the lack of convenient solutions to monitor and evaluate the quality of signals propagating over a radio channel, including without limitation radio channels that carry at once analog and digital signals.

Generally speaking, the present technology introduces a method and a mobile system for evaluating signal propagation over one or more radio channels. The mobile system measures radiofrequency (RF) signal levels and demodulated metrics of radio channels, including ratios of sideband digital signals to analog frequency modulation (FM) carriers, over the entire FM band. The mobile system may utilize GPS reception using wide area augmentation system (WAAS) and/or European geostationary navigation overly service (EGNOS). The mobile system may provide real-time propagation analysis reports on unexpected RF drops, on the presence of interferers, sideband power ratio mismatches, and some more features.

The mobile system may use predicted values obtained by uploading in the system the propagation files that are representative of broadcasting databases. Although capable of evaluating the performance of hybrid digital radio systems, the mobile system is also compatible with traditional analog FM systems.

Although the name HD Radio™, is a registered trademark of XPERI Corporation, the expression 'HD radio' is used herein to generally refer to hybrid digital (HD) radio systems, signals and channels.

Figure 3:
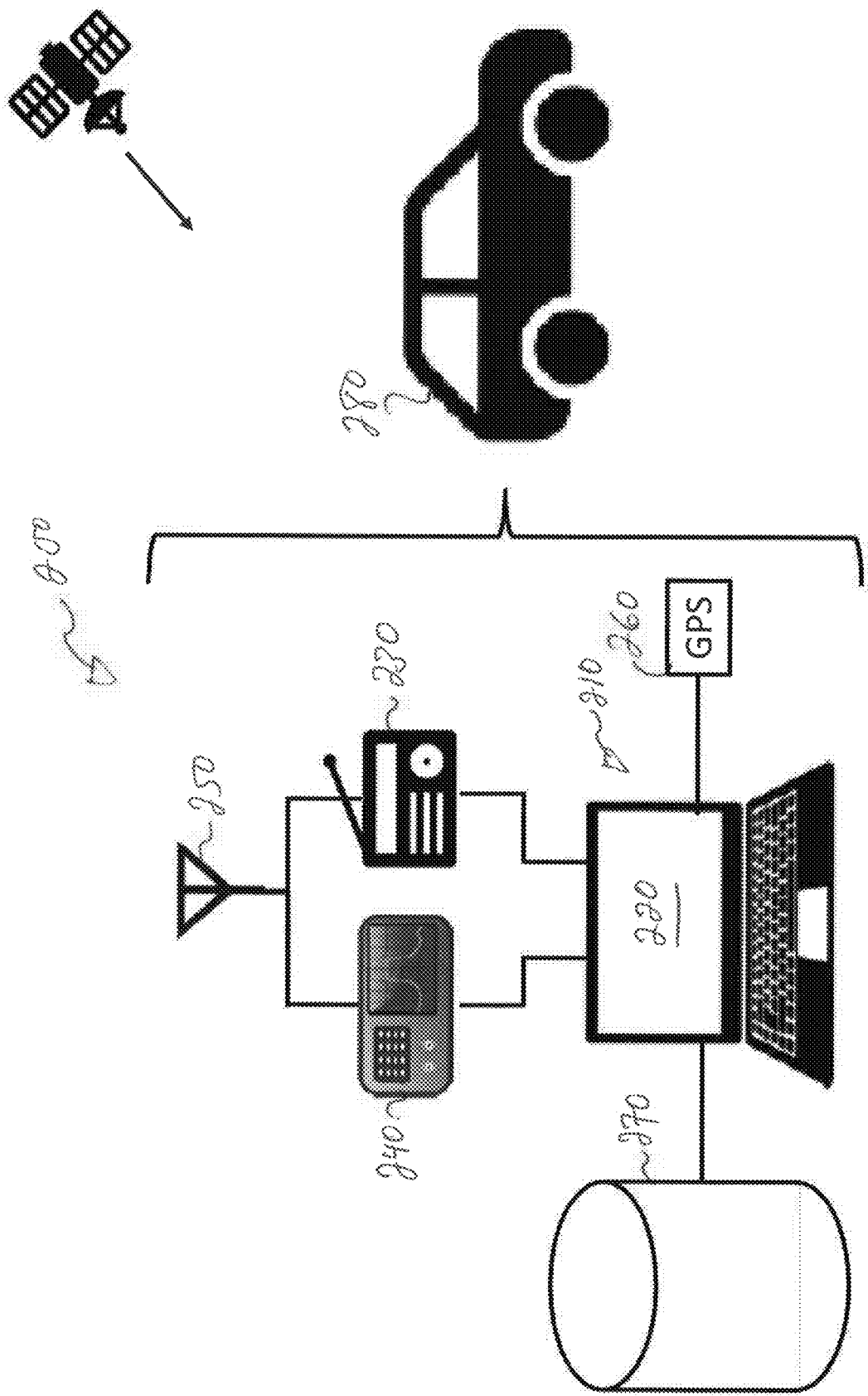
FIG. 3 is a block diagram showing components of a mobile system for evaluating signal propagation over a radio channel according to an embodiment.
Figure 4:
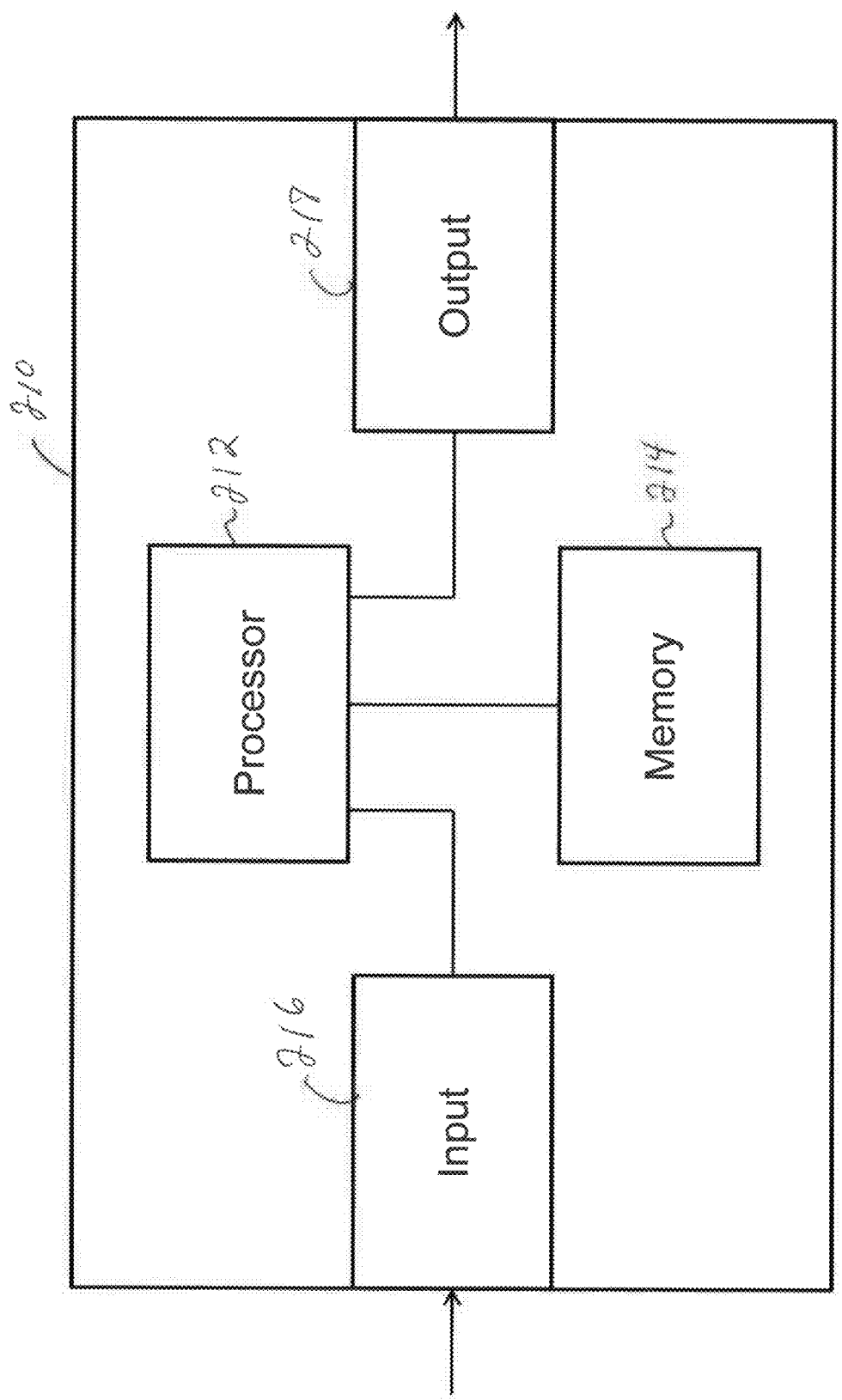
FIG. 4 is a block diagram showing internal components of a computer of FIG. 3.

Referring now to the drawings, FIG. 3 is a block diagram showing components of a mobile system for evaluating signal propagation over a radio channel according to an embodiment. FIG. 4 is a block diagram showing internal components of a computer of FIG. 3. Referring at once to FIGS. 3 and 4, a mobile system 200 comprises a computer 210 that includes a processor or a plurality of cooperating processors (represented as a processor 212 for simplicity), a memory device or a plurality of memory devices (represented as a memory device 214 for simplicity), an input device or a plurality of input devices (represented as an input device 216) and an output device or a plurality of output devices (represented as an output device 218). The input device 216 and the output device 218 may be combined in an input/output device. The processor 212 is operatively connected to the memory device 214, to the input device 216 and to the output device 218. The computer 210 further includes a display screen 220. Without limitation, the computer 210 may support any 32-bit or 64-bit versions of Microsoft™ Windows™ version 10 or equivalent, the memory device 214 may support between 2 to 4 gigabytes of system memory capacity or more, the processor may have four (4) logical cores, and the display screen 220 may have a 1280 by 768 pixels resolution or better.

The mobile system 200 also comprises a receiver 230 and a signal analyzer 240, as well as an antenna 250 connected to the receiver 230 and to the analyzer 250. The mobile system 200 may also comprise a GPS receiver 260 and an external database 270, both of which are connected to the input device 216 and/or output device 218 of the computer 210.

Figure 5:
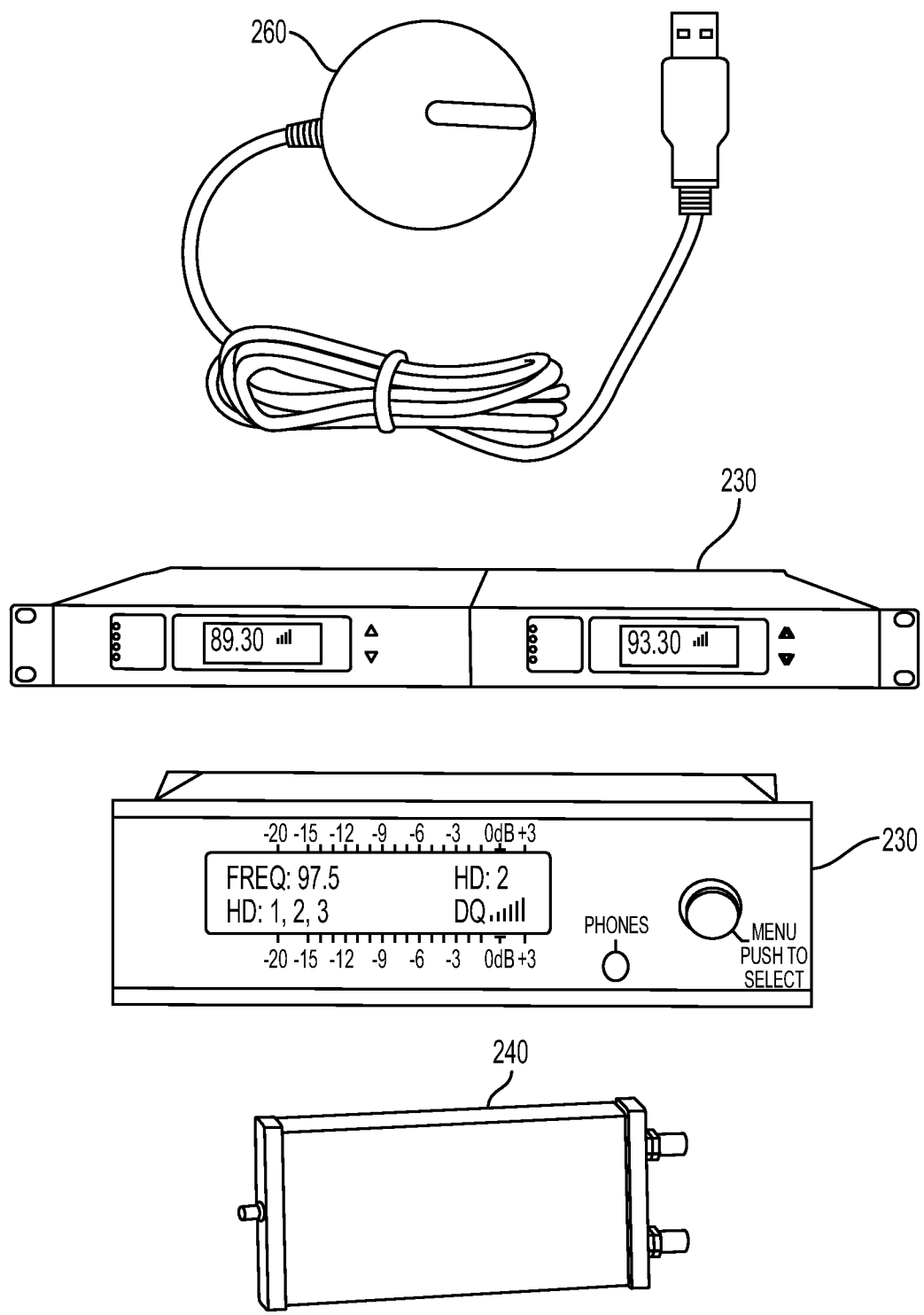
FIG. 5 is an illustration of examples of some components of the mobile system of FIG. 3.

FIG. 5 is an illustration of examples of some components of the mobile system of FIG. 3. Without limitation, the receiver 230 may be a MAM2™ (Market Area Monitor) radio receiver from DaySequerra™, or an INOmini HD Radio™ SiteStreamer™ Model 638 from Inovonics Broadcast. Also without limitation, the signal analyzer 240 may be a USB-SA44B-4.4 GHz Spectrum Analyzer from Signal Hound™. In a non-limiting embodiment, the GPS receiver 260 may be a BU-353-S4 5 Hz GPS receiver from USGlobalSat™. These particular devices provide good performance for achieving the needs of the mobile system 200; however other devices may also provide suitable performance.

Figure 6:
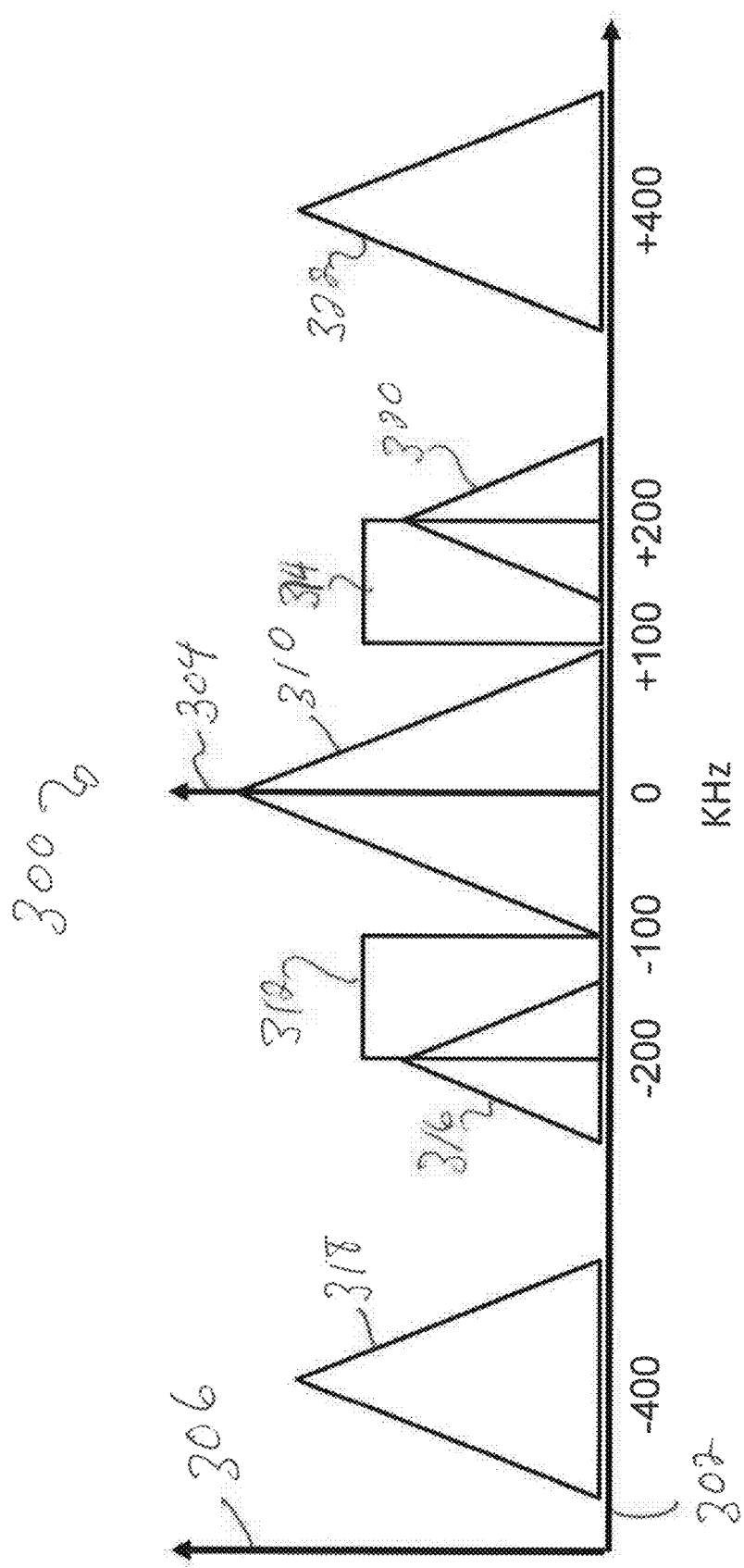
FIG. 6 is an illustration of a radio bandwidth over which signals are analyzed by the signal analyzer of FIG. 3.

FIG. 6 is an illustration of a radio bandwidth over which signals are analyzed by the signal analyzer of FIG. 3. A chart 300 shows a horizontal axis 302 on which a center frequency 304 is highlighted. Dimensions on the horizontal axis 302 are expressed in terms of offset frequencies from the center frequency 304 in kHz. A dimensionless vertical axis 306 represents a relative power of various signals; these relative powers illustratively represent power levels of the signals without being to scale. A HD channel comprises an analog FM 310 having carrier on the center frequency 304, a lower digital sub-channel 312 and an upper digital sub-channel 314. Other channels include a first lower adjacent FM carrier 316, a second lower adjacent FM carrier 318, a first upper adjacent FM carrier 320 and a second upper adjacent FM carrier 322. The signal analyzer 240 is adapted to evaluate channel power over the entire shown bandwidth. It may be noted that the mobile system 200 may be used to doing analog FM-only analysis. In those cases, the digital sub-channels 312 and 314 are simply ignored.

Returning to FIG. 3, the mobile system 200 is intended for mounting in a vehicle 280 so that the various components of the mobile system 200 may receive power from a DC power outlet (not shown) of the vehicle 280 and so that the mobile system 200 may follow a test route including a plurality of measurement points distributed over a geographical area in view of evaluating signal propagation over a radio channel.

The memory device 214 stores predicted values for the radio channel, the predicted values being distributed over the geographical area. The predicted values are related to various parameters of the radio channel that, according to propagation models, would be expected to be obtained from metrics taken over the geographical area. In an embodiment, a relationship between the predicted values and the geographical area may be expressed using the proprietary KML format used in Google Earth™. As the mobile system 200 follows the test route, the receiver 230 and the signal analyzer 240 receive a signal on the radio channel and acquire one or more metrics of the signal at each of the plurality of measurement points. In particular, the signal analyzer 240 may measure a signal strength for the channel under test and measure interference caused signals on the adjacent carriers 316, 318, 320 and 322 shown on FIG. 6.

Figure 1:
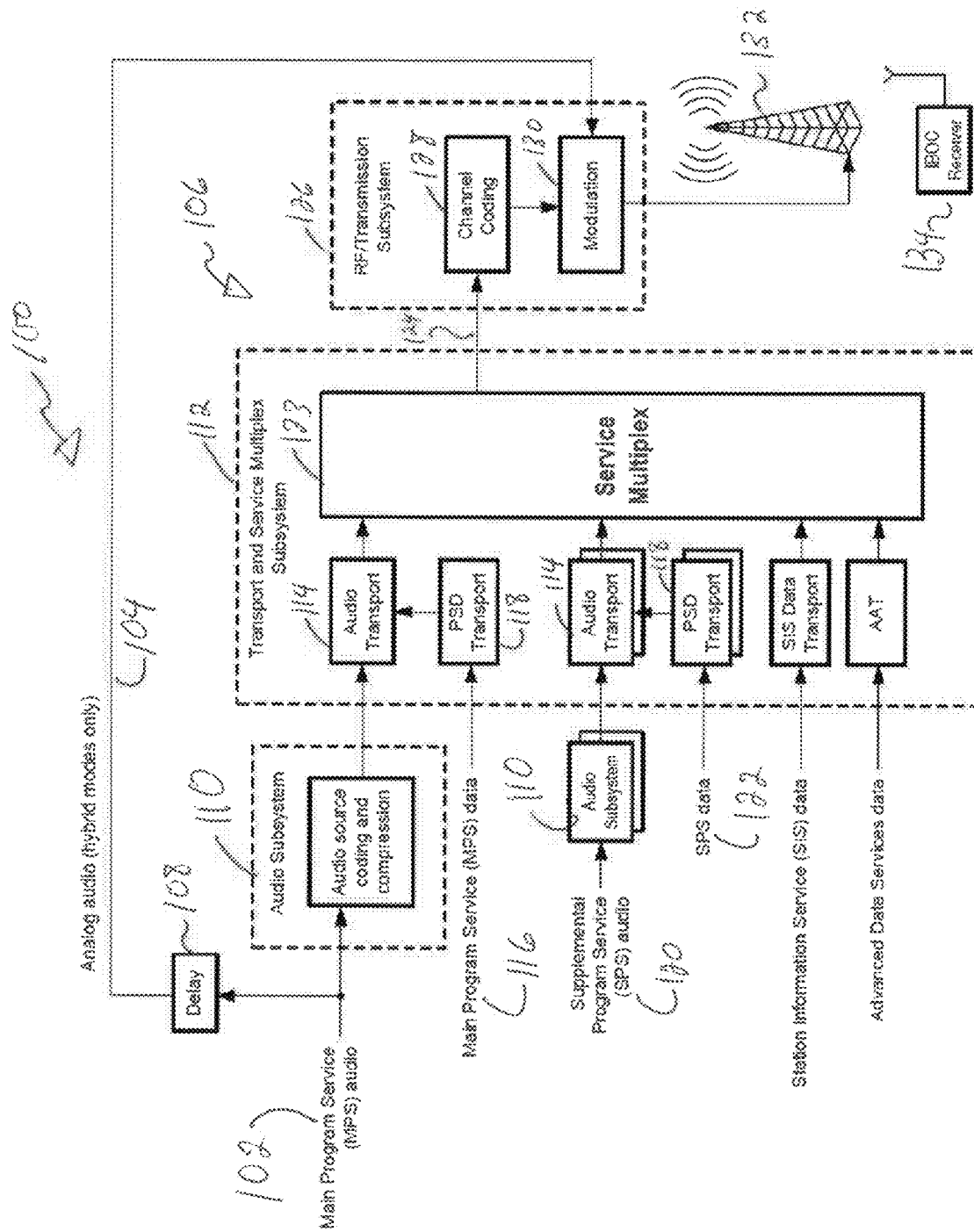
FIG. 1 (Prior Art) is a National Radio Systems Committee (NRSC) reference model for a hybrid mode broadcast radio system.
Figure 2:
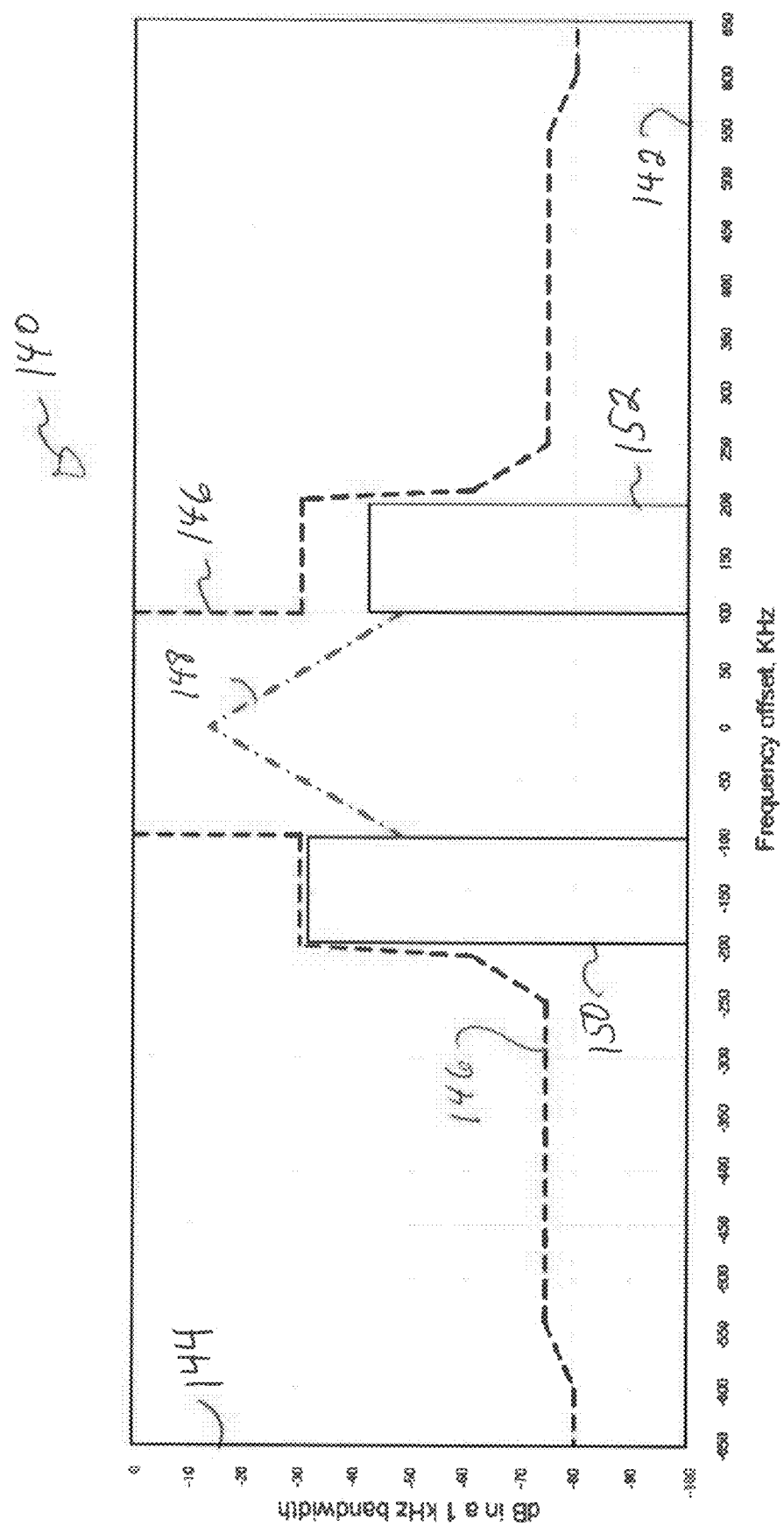
FIG. 2 (Prior Art) is a standard radio emission mask for hybrid mode broadcast radio.

In an embodiment, the metrics may also comprise demodulated signal quality information for HD radio signal and/or on the analog FM signal. The processor 212 may use signals from the GPS receiver 260 to determine GPS coordinates for each of the plurality of measurement points and use the GPS coordinates to associate each of the one or more metrics with the corresponding predicted value. For each measurement point, the processor 212 compares each of the one or more metrics with a corresponding predicted value that it reads from the memory device 214. Based on the comparisons, the processor 212 evaluates a radiation pattern of an antenna, such as the antenna 132 of FIG. 1, which is transmitting on the radio channel.

It may be observed that instead of the receiver 230 and the signal analyzer 240 being separately connected to the antenna 250, another connection arrangement in which the signal is received at the antenna 250, transmitted to one of the receiver 230 or signal analyzer 240 and then forwarded to the other one of the receiver 230 or signal analyzer 240 is also contemplated.

Although the mobile system 200 may be used to evaluate signal propagation over a FM radio channel, an embodiment of the mobile system 200 includes capabilities to evaluate the signal propagation and other performance metrics of a hybrid digital (HD) radio channel, the receiver 230 being a HD radio receiver in that embodiment. The predicted values and the corresponding metrics may include one or more or any combination of an indicator of acquisition of the HD radio channel, an indicator of acquisition of digital audio content of the HD radio channel, a digital audio quality indicator (QI) for the HD radio channel, a digital audio availability indicator (DAAI) for the HD radio channel, a status of a blend control for analog and digital contents of the HD radio channel, a digital carrier to noise (Cd/No) ratio for the HD radio channel, a power level of a frequency modulation (FM) component of the HD radio channel, a multipath of the FM component of the HD radio channel, a loss of radio data system (RDS) information for the HD radio channel, a RDS program identification (PI) code for the HD radio channel, a signal to noise ratio of the FM component of the HD radio channel, a received signal power of the HD radio channel, a HD radio sideband signal power for the HD radio channel, a signal power on a first adjacent channel to the HD radio channel, and/or a signal power on a second adjacent channel to the HD radio channel.

The memory device 214 may store any one or both of the one or more metrics of the signal received at the receiver 230 and/or at the signal analyzer 240 for each of the plurality of measurement points and the comparisons made by the processor 212 for each measurement point. In order to allow storing large amounts of these data, the processor 212 may cause these metrics and these comparison results to be output via the output device 218 toward the database 270, which is another memory device.

The output device 218 of the computer 210 may include and an external stereo interface (not shown) that may connect to an audio system (not shown) of the vehicle 280, for example via a Bluetooth™ connection or via an auxiliary port of the audio system of the vehicle 280. The computer 210 may output, via the external stereo interface, an analog audio sound from the HD radio channel on a first audio channel of the audio system of the vehicle 280, for example on the left channel of the audio system, and a digital audio sound from the HD radio channel on a second audio channel of the audio system of the vehicle 280, for example on the right channel of the audio system. An operator of the mobile system 200 may readily recognize whether or not the mobile system 200 is tuned to the intended radio channel, according to a planned evaluation program. The computer 210 may also emit audible warning messages via the audio system of the vehicle 280, for example and without limitation, when analog or digital audio reception is lost in areas of the test route where coverage is expected to be present.

In an embodiment, the processor 212 may compare in real-time each of the one or more metrics from the receiver 230 and from the signal analyzer 240 with the corresponding predicted values. In this or another embodiment, the processor 212 may cause the external stereo interface of the output device 218 to forward audible information for the benefit of the operator of the mobile system 200, the audible information being for example indicative of comparison results obtained in real-time. The processor 212 may also cause the display screen 220 to display a map of the geographical area and to overlay on the map an indication of the comparison for each measurement point. In a variant, the processor 212 may cause the output device 218 to forward the map and the overlaid indications to a display screen (not shown) of the vehicle 280.

Although a single receiver 230 is shown, the mobile system 200 may include a plurality of receivers 230, for example five (5) receivers 230, which are all connected to the computer 210 and which concurrently receive signals from on a plurality of distinct radio channels. There is no a priori limit to the number of receivers 230 that can be made part of the mobile system 200; the skilled reader will appreciate that the processing and networking capabilities of the computer 210 may determine how much data it can concurrently receive and process from a number of receivers 230. It may be noted that the mobile system 200 may operate with a single spectrum analyzer 240 in configurations having a plurality of receivers 230. The antenna 250 may be selected to provide good reception over a broad bandwidth covered by the plurality of receivers 230. A plurality of antennas 250 may also be used.

Figure 7:
FIG. 7 is a map showing measurement points along a partial test route defined in a geographical area.

FIG. 7 is a map showing measurement points along a partial test route defined in a geographical area. The mobile system 200 travels on a test route 350 that includes a plurality of measurement points 355. A speed of the vehicle 280 may continuously vary, the vehicle 280 moving at highway speeds at some times and being stopped at a red light at other times. The GPS receiver 260 may have a 5 Hertz capability, being able to provide a precise location of the mobile system 200 five (5) times per second; metrics could in principle be obtained at many proximally located measurement points when the vehicle 280 moves at slow speeds without adding much to the overall effectiveness of the measurement process. The computer 210 may use a signal from the GPS receiver 260 to select the measurement points 355 so that they are substantially equidistant along the test route 350. In a non-limiting example, the measurement points 355 may be located at 50 meters from one another.

Figure 8:
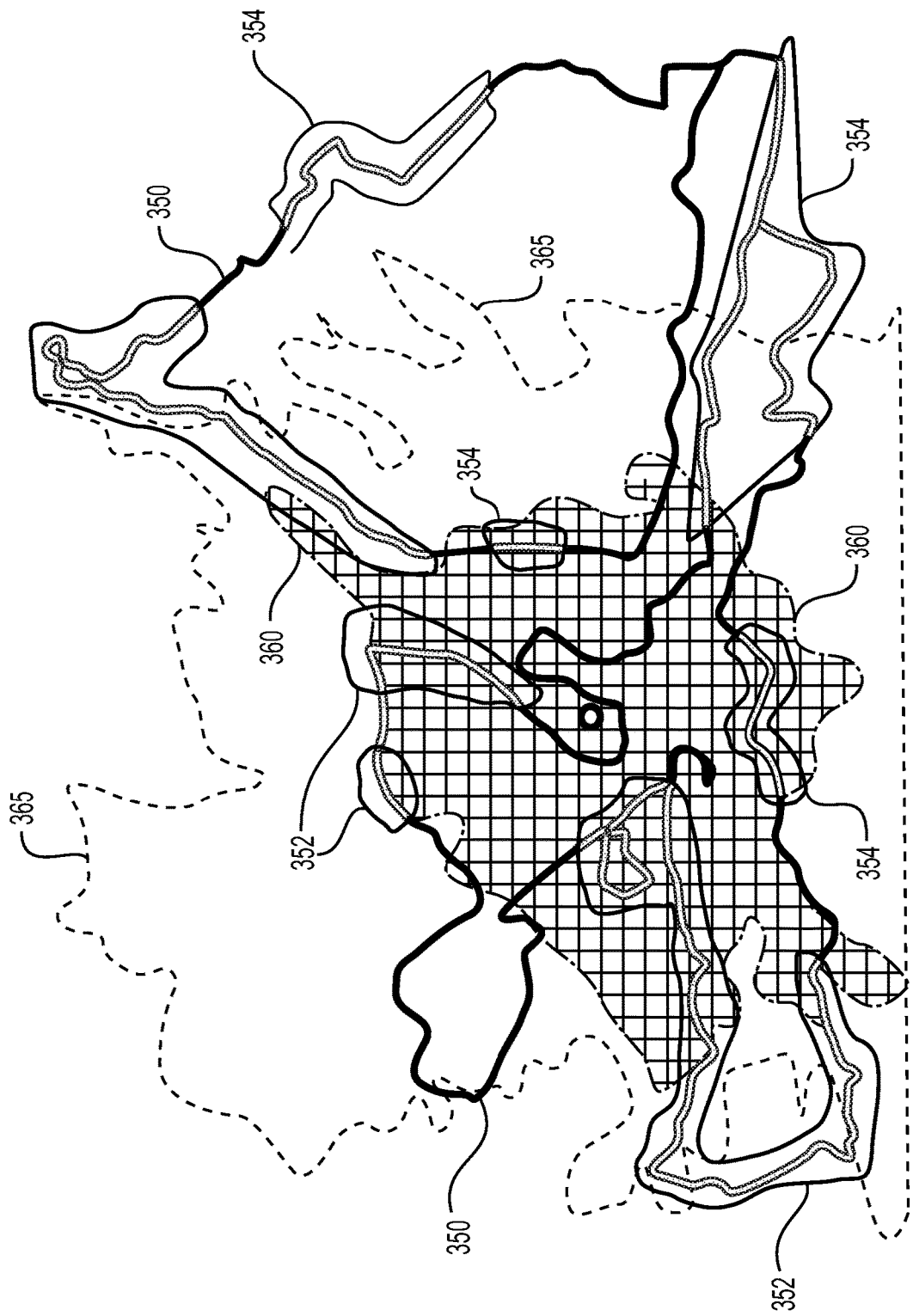
FIG. 8 is a map showing metrics of radio-frequency (RF) coverage levels over a test route.

FIG. 8 is a map showing metrics of radio-frequency (RF) coverage levels over a test route. Actual metrics were taken on a test route 350 in the Greater Montreal Area, QC, Canada. The entirety of the test route 350 is shown on FIG. 8. An area 360 shows a predicted HD coverage area of a digital component of an HD channel for a certain quality level. An area 365 shows a predicted HD coverage area for the HD channel at a lower quality level. Similar areas could also show predicted coverage for other services, such as analog FM. The areas 360 and 365 were obtained by generating a coverage prediction based on the information provided from a broadcasting database of the Innovation, Science and Economic Development (ISED) Department of the Canadian Government and are approximated to simplify the illustration. Equivalent information may be obtained from the Federal Communications Commission (FCC) in the United States and from respective government agencies in other countries. The areas 360 and 365 could alternatively be defined based on simulations using, for example, a CRC-PREDICT propagation model, a Longley-Rice radio propagation model, a ITU-1546 propagation, or other propagation models supported by the mobile system 200.

A geographical location of an antenna 370 emitting on the HD channel is also shown on FIG. 8. On the test route 350, power levels received at the mobile system 200, typically measured in terms of field strength values expressed in decibel-microvolts per meter (dBpV/m), were significantly lower than predicted in areas 352 and significantly higher than expected in areas 354. There was no significant difference between predicted and received power levels in unmarked segments of the test route 350.

Figure 9:
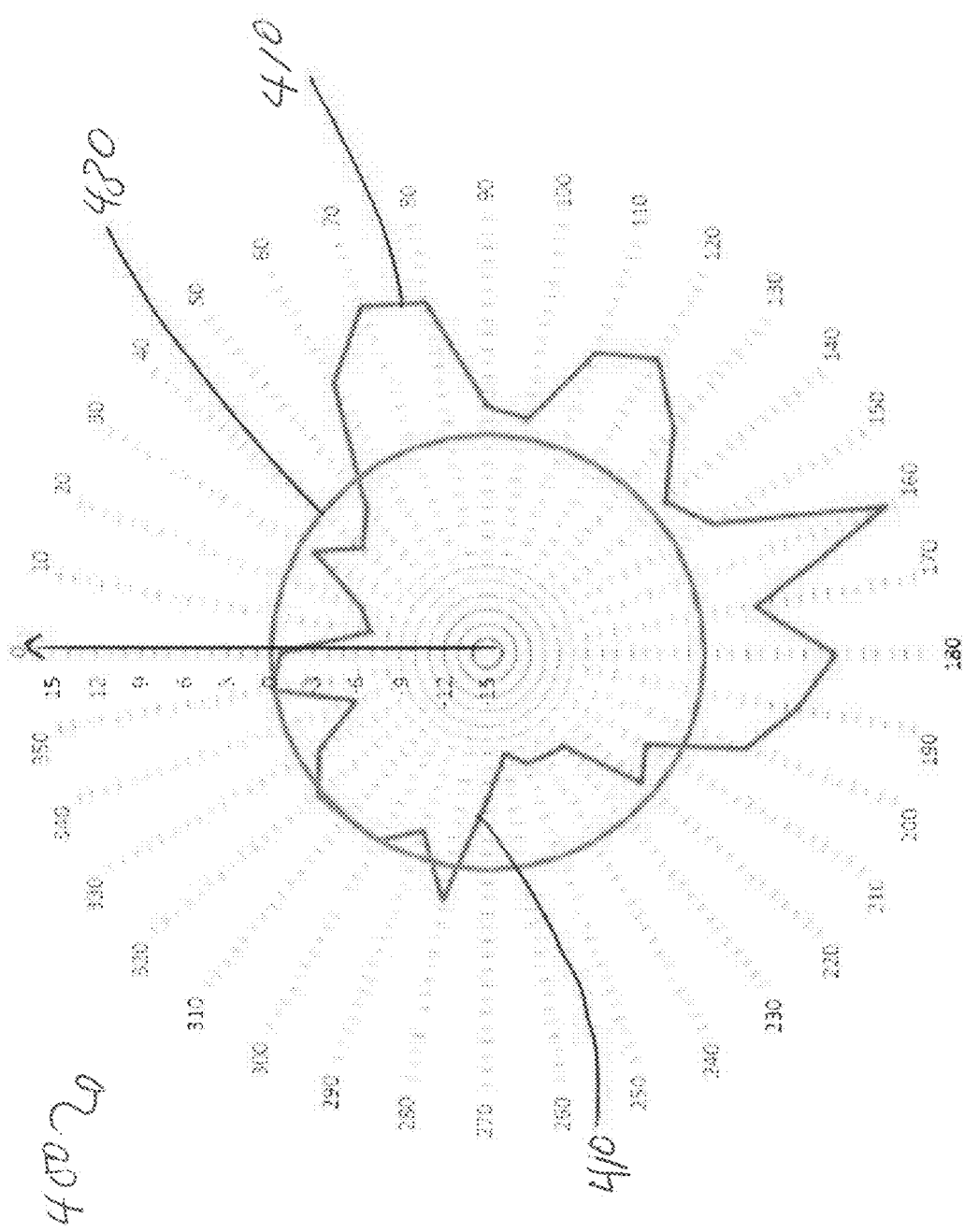
FIG. 9 is an antenna validation chart according to an embodiment.

FIG. 9 is an antenna validation chart according to an embodiment. An antenna validation chart 400 shows a radiation pattern of the antenna 370 expressed as a difference 410, for each of a plurality of azimuth angles, between a predicted antenna radiation pattern and the comparisons produced by the processor 212. On FIG. 9, the azimuth 0 degree corresponds to the true North direction. An axis 420 between a center and edges of the chart 400 shows differences, for varying azimuth angles, between predicted signal levels and actual signal levels measured along the test route 350 for a plurality of measurement points 355. A circle 430 shows a difference of 0 dB where the received power would be proportional to the predicted received power. The circle 430 is based on predictions that may take into account variations of the gain of the antenna 370 in cases where the antenna is not purely omnidirectional. For example, if the gain in the South direction (180 degrees) is meant to be 6 dB lower than in the North direction (0 degrees), the predicted received power is also 6 dB lower at 180 degrees. A variant (not shown) of the chart of FIG. 9 (not shown) may include a comparison to the actual antenna pattern, instead of a comparison to the error from the antenna pattern relative to 0 dB. As an example, an error of +6 dB from the antenna pattern is seen as +6 dB on the FIG. 9, but may be shown as −14 dB on a representation relative to an antenna pattern in a direction where the pattern would have a gain of −20 dB. The end result may still be interpreted as showing a +6 dB error variation.

On FIG. 9, the difference 420 shows that the received power is significantly higher than predicted between azimuths of about 60 and 80 degrees, between 110 and 125 degrees, and again between 155 and 190 degrees, with a strong peak at 160 degrees. The received power is significantly lower than predicted between about 225 and 270 degrees, between 330 and 345 degrees, and again between 5 and 25 degrees. Azimuths in which the received power is significantly lower or higher than predicted are reflected in areas 352 and 354 of FIG. 8.

Figure 10:
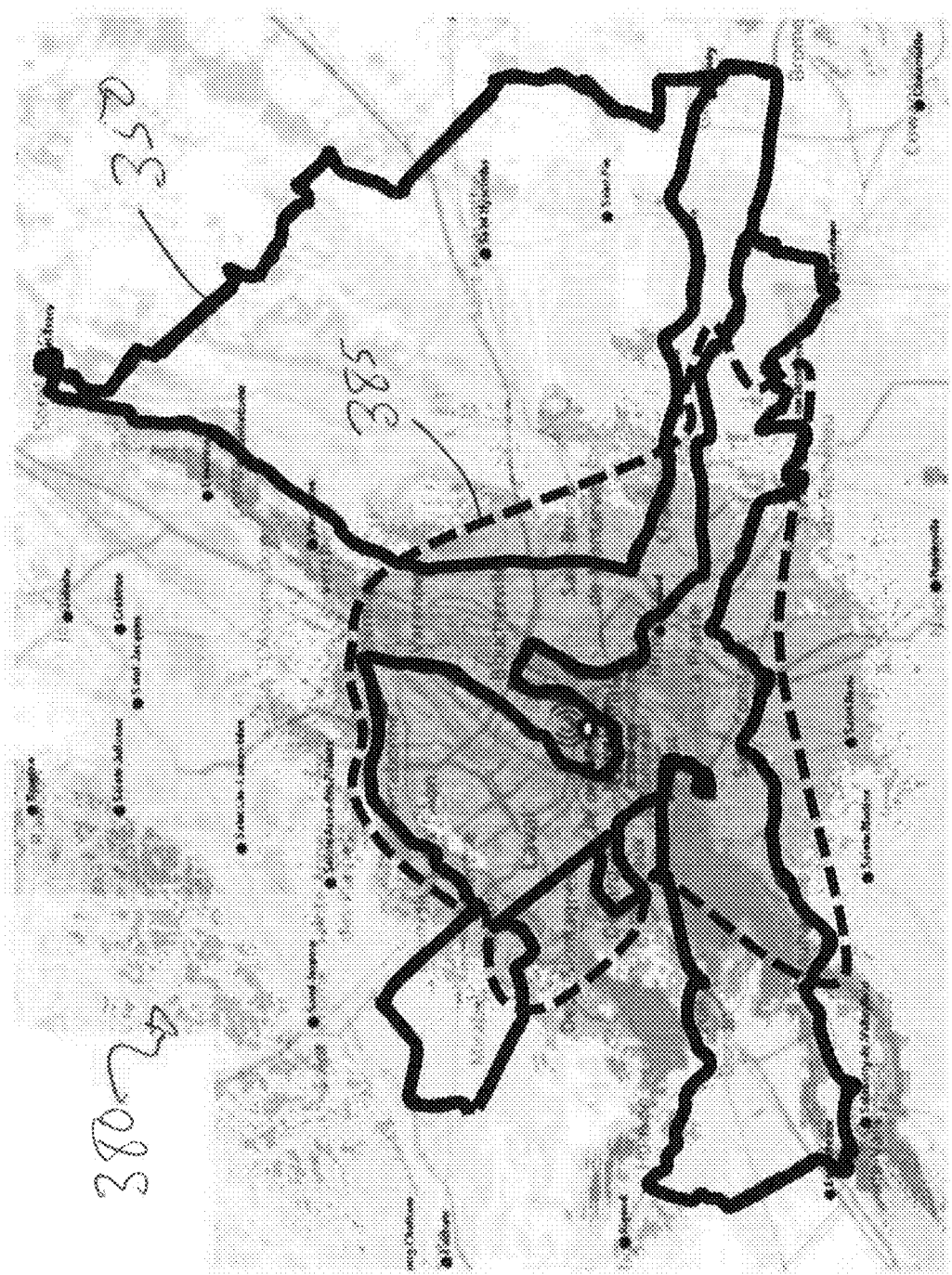
FIG. 10 is a map showing a geographical area where HD audio was properly decoded along the test route.

FIG. 10 is a map showing a geographical area where HD audio was properly decoded along the test route. The mobile system 200 may import a geographical map 380, for example using data obtained from Google Earth™, superpose the test route 350 on the map 380 and further superpose additional information based on the analysis of the metrics. In the example of FIG. 10, areas along the test route 350 where HD audio signal was properly decoded are found within a perimeter 385. Other maps representing other metrics may also be created by the mobile system 200.

Figure 11A:
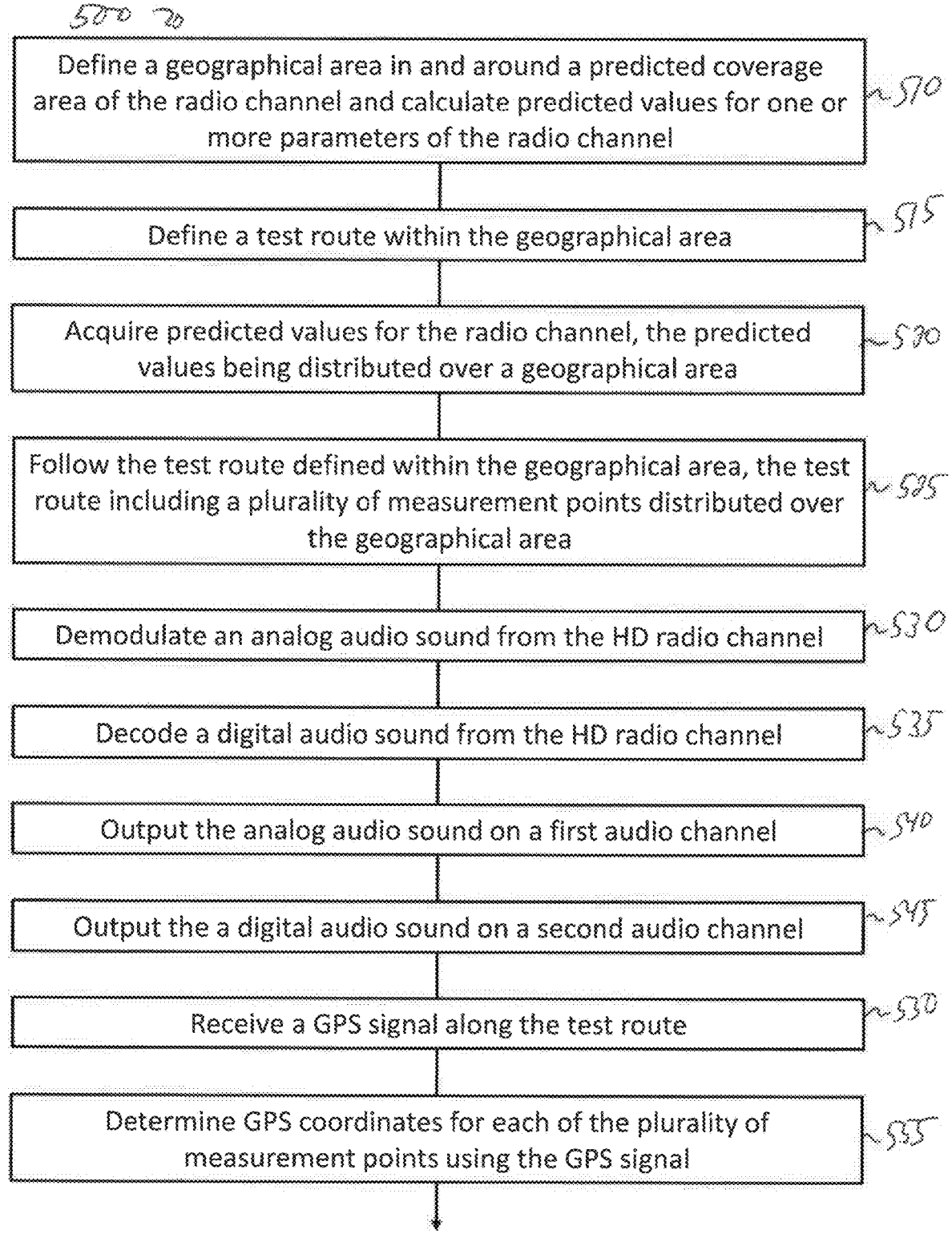
FIGS. 11a and 11b are a sequence diagram showing operations of a method for evaluating signal propagation over a radio channel according to an embodiment.
Figure 11B:
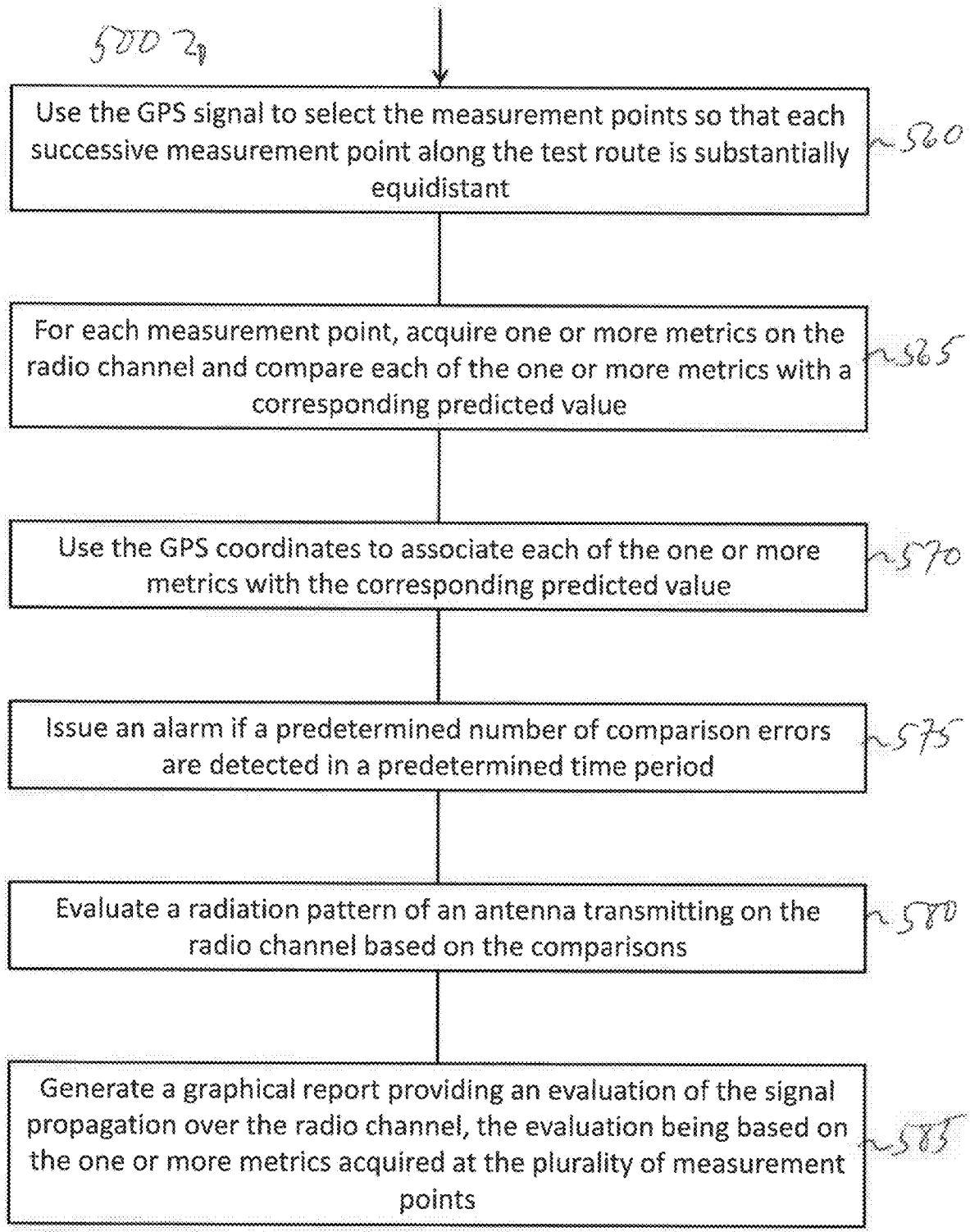

FIGS. 11a and 11b is a sequence diagram showing operations of a method for evaluating signal propagation over a radio channel according to an embodiment. On FIGS. 11a and 11b, a sequence 500 comprises a plurality of operations that may be executed in variable order, some of the operations possibly being executed concurrently, some of the operations being optional.

The sequence 500 may begin at operation 510 in which a geographical area is defined in and around a predicted coverage area of radio channel. Operation 510 may also include a calculation of predicted values for one or more parameters of the radio channel. Operation 510 may for example be performed by applying a propagation model to a topographical map of the area and to parameters of the radio station 100 broadcasting on the radio channel.

A test route 350 may be defined in the geographical area at operation 515. At operation 520, the mobile system 200 acquires predicted values for the radio channel, the predicted values being distributed over a geographical area. The predicted values may be obtained from the calculations performed at operation 510. The predicted values may alternatively be obtained from a governmental broadcasting database, from the operator of the radio station 100, or from any other suitable source. The mobile system 200, being for example mounted in the vehicle 280, follows the test route 350 defined within the geographical area at operation 525. The test route 350 includes a plurality of measurement points 355 distributed over the geographical area, as illustrated for example on FIG. 7. Although the test route 350 may have been pre-defined at operation 515, in a variant, the operator of the mobile system 200 may instead choose to drive the vehicle 280 along the geographical area until satisfied that measurement points 355 with a sufficient distribution have been collected.

A signal received on the radio channel may comprise an analog FM component and a digital component, the radio channel being for example a hybrid digital (HD) radio channel. The mobile system 200 may demodulate an analog audio sound from the HD radio channel at operation 530, decode a digital audio sound from the HD radio channel at operation 535, output the analog audio sound on a first monaural audio channel at operation 540, and output the digital audio sound on a second monaural audio channel at operation 545. In this context, the expression 'analog audio sound' is to be understood as designating the sound obtained by demodulating the analog FM component of the radio channel. Likewise, the expression 'digital audio sound' is to be understood as designating the sound obtained by decoding the digital component of the radio channel. The mobile system 200 may direct the analog and digital audio sound to respective first and second channels of a stereo receiver of the vehicle 280 or to any stereo receiver mounted in the vehicle 280.

At operation 550, the mobile system 200 may receive a global positioning system (GPS) signal along the test route 350. The mobile system 200 determines GPS coordinates for each of the plurality of measurement points 355 using the GPS signal at operation 555. Operation 560 may comprise using the GPS signal to select the measurement points 355 so that each successive measurement point 355 along the test route 350 is substantially equidistant.

At operation 565, for each measurement point 355, the mobile system 200 acquires one or more metrics on the radio channel and compares each of the one or more metrics with a corresponding predicted value. These comparisons may be performed in real-time as the mobile system 200 moves along the test route 350. Storing the acquired one or more metrics in memory, for example in the database 270 of FIG. 3 for later post-processing, is also contemplated. The mobile system 200 may use the GPS coordinates at operation 570 to associate each of the one or more metrics with the corresponding predicted value.

An alarm may be issued at operation 575 if a predetermined number of comparison errors are detected in a predetermined time period. It may be noted that the operator of the mobile system 200 may also rely on the sound coming from the stereo receiver of the vehicle 280 to discover errors such as poor reception quality or having tuned the mobile system 200 on the wrong radio channel.

The sequence 500 continues at operation 580 in which the mobile system 200 evaluates a radiation pattern of an antenna transmitting on the radio channel based on the comparisons. This evaluation of the radiation pattern may optionally comprise averaging the comparisons over a plurality of successive measurement points 355 along the test route 350. Optionally, the radiation pattern may be expressed as a difference, for each of a plurality of azimuth angles, between a predicted antenna radiation pattern and the comparisons.

At operation 585, the mobile system 200 may generate one or more graphical reports providing an evaluation of the signal propagation over the radio channel, the evaluation being based on the one or more metrics acquired at the plurality of measurement points. The graphical reports may for example overlay information about the one or more metrics and/or comparisons between the one or more metrics and the corresponding predicted values over a Google Earth™ image of the geographical area. The graphical reports are useful in evaluating an overall signal quality of the radio channel, for example when it is desired to determine whether or not the radio channel meets its intended performance specifications.

In cases where the radio channel is a HD radio channel, the predicted values may comprise any one, or more, of an indicator of acquisition of the HD radio channel, an indicator of acquisition of digital audio content of the HD radio channel, a digital audio quality indicator (QI) for the HD radio channel, a digital audio availability indicator (DAAI) for the HD radio channel, a status of a blend control for analog and digital contents of the HD radio channel, a digital carrier to noise (Cd/No) ratio for the HD radio channel, a power level of a frequency modulation (FM) component of the HD radio channel, a multipath of the FM component of the HD radio channel, a loss of radio data system (RDS) information for the HD radio channel, a RDS program identification (PI) code for the HD radio channel, a signal to noise ratio of the FM component of the HD radio channel, a received signal power of the HD radio channel, a HD radio sideband signal power for the HD radio channel, a signal power on a first adjacent channel to the HD radio channel, and/or a signal power on a second adjacent channel to the HD radio channel.

Each of the operations of the sequence 500 may be configured to be processed by one or more processors, for example the processor 212, the one or more processors being coupled to a memory, for example the memory device 214.

Those of ordinary skill in the art will realize that the description of the method and mobile system for evaluating signal propagation over a radio channel are illustrative only and are not intended to be in any way limiting. Other embodiments will readily suggest themselves to such persons with ordinary skill in the art having the benefit of the present disclosure. Furthermore, the disclosed method and mobile system may be customized to offer valuable solutions to existing needs and problems related to the evaluation of the quality of signals propagating over a radio channel. In the interest of clarity, not all of the routine features of the implementations of the method and mobile system are shown and described. In particular, combinations of features are not limited to those presented in the foregoing description as combinations of elements listed in the appended claims form an integral part of the present disclosure. It will, of course, be appreciated that in the development of any such actual implementation of the method and mobile system, numerous implementation-specific decisions may need to be made in order to achieve the developer's specific goals, such as compliance with application-, system-, network-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of broadcast radio signal evaluation having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A method for evaluating signal propagation over a radio channel, comprising:
   acquiring predicted values for the radio channel, the predicted values being distributed over a geographical area;
   following a test route defined within the geographical area, the test route including a plurality of measurement points distributed over the geographical area;
   receiving a global positioning system (GPS) signal along the test route;
   determining GPS coordinates for each of the plurality of measurement points using the GPS signal;
   for each measurement point, acquiring one or more metrics on the radio channel and comparing each of the one or more metrics with a corresponding predicted value;
   using the GPS coordinates to associate each of the one or more metrics with the corresponding predicted value; and
   evaluating a radiation pattern of an antenna transmitting on the radio channel based on the comparisons, wherein the radiation pattern is expressed as a difference, for each of a plurality of azimuth angles, between a predicted antenna radiation pattern and the comparisons.

2. The method of claim 1, further comprising generating a graphical report providing an evaluation of the signal propagation over the radio channel, the evaluation being based on the one or more metrics acquired at the plurality of measurement points.

3. The method of claim 1, further comprising defining the geographical area in and around a predicted coverage area of the radio channel and calculate the predicted values for one or more parameters of the radio channel.

4. The method of claim 1, wherein the radio channel is a hybrid digital (HD) radio channel.

5. The method of claim 4, wherein the metrics are selected from an indicator of acquisition of the HD radio channel, an indicator of acquisition of digital audio content of the HD radio channel, a digital audio quality indicator (QI) for the HD radio channel, a digital audio availability indicator (DAAI) for the HD radio channel, a status of a blend control for analog and digital contents of the HD radio channel, a digital carrier to noise (Cd/No) ratio for the HD radio channel, a power level of a frequency modulation (FM) component of the HD radio channel, a multipath of the FM component of the HD radio channel, a loss of radio data system (RDS) information for the HD radio channel, a RDS program identification (PI) code for the HD radio channel, a signal to noise ratio of the FM component of the HD radio channel, a received signal power of the HD radio channel, a HD radio sideband signal power for the HD radio channel, a signal power on a first adjacent channel to the HD radio channel, a signal power on a second adjacent channel to the HD radio channel, and any combination thereof.

6. The method of claim 4, further comprising:
   decoding a digital audio sound from the HD radio channel;
   demodulating an analog audio sound from the HD radio channel;
   outputting the digital audio sound on a first audio channel; and
   outputting the analog audio sound on a second audio channel.

7. The method of claim 1, wherein the one or more metrics are compared in real-time with the corresponding predicted values.

8. The method of claim 7, further comprising issuing an alarm if a predetermined number of comparison errors are detected in a predetermined time period.

9. The method of claim 1, further comprising:
using the GPS signal to select the measurement points so that each successive measurement point along the test route is substantially equidistant.

10. The method of claim 1, wherein evaluating the radiation pattern based on the comparisons comprises averaging the comparisons over a plurality of successive measurement points along the test route.

11. A mobile system for evaluating signal propagation over a radio channel on a test route followed by the mobile system, the test route including a plurality of measurement points distributed over a geographical area, the mobile system comprising:
a memory device adapted to store predicted values for the radio channel, the predicted values being distributed over the geographical area;
a signal analyzer configured to receive a signal on the radio channel and to acquire one or more metrics of the signal at each of the plurality of measurement points;
a global positioning system (GPS) receiver; and
a processor operatively connected to the memory device, to the GPS receiver, and to the signal analyzer, the processor being adapted to:
determine GPS coordinates for each of the plurality of measurement points using a GPS signal from the GPS receiver,
use the GPS coordinates to associate each of the one or more metrics with a corresponding predicted value,
for each measurement point, compare each of the one or more metrics with the corresponding predicted value, and
evaluate a radiation pattern of an antenna transmitting on the radio channel based on the comparisons, wherein the radiation pattern is expressed as a difference, for each of a plurality of azimuth angles, between a predicted antenna radiation pattern and the comparisons.

12. The system of claim 11, further comprising a receiver operatively connected to the processor, the receiver being adapted to receive the signal on the radio channel and to acquire at least one or more additional metrics of the signal, wherein the processor is further adapted to compare each of the one or more additional metrics with a corresponding additional predicted value for each measurement point.

13. The system of claim 12, wherein:
the radio channel is a hybrid digital (HD) radio channel; and
the receiver is a HD radio receiver.

14. The system of claim 13, further comprising an external stereo interface operatively connected to the computer and adapted to output an analog audio sound from the HD radio channel on a first audio channel and to output a digital audio sound from the HD radio channel on a second audio channel.

15. The system of claim 11, further comprising a display screen operatively connected to the processor, the processor being further adapted to cause the display screen to display a map of the geographical area and to overlay on the map an indication of the comparison for each measurement point.

16. The system of claim 11, wherein the memory device is further adapted to store the one or more metrics of the signal received at the signal analyzer for each of the plurality of measurement point and to store the comparisons for each measurement point.

17. The system of claim 11, wherein the processor is adapted to compare each of the one or more metrics with the corresponding predicted values in real-time.

18. A mobile system for evaluating signal propagation over a plurality of radio channels on a test route followed by the mobile system, the test route including a plurality of measurement points distributed over a geographical area, the mobile system comprising:
a memory device adapted to store predicted values for each of the plurality of radio channels, the predicted values being distributed over the geographical area;
one or more receivers, each receiver being adapted to receive a signal on a corresponding one of the plurality of radio channels and to acquire one or more metrics of the signal at each of the plurality of measurement points;
a global positioning system (GPS) receiver; and
a processor operatively connected to the memory device, to the GPS receiver, and to each of the one or more receivers, the processor being adapted to:
determine GPS coordinates for each of the plurality of measurement points using a GPS signal from the GPS receiver,
use the GPS coordinates to associate each of the one or more metrics with a corresponding predicted value,
for each measurement point and for each of the plurality of radio channels, compare each of the one or more metrics with the corresponding predicted value, and
evaluate a radiation pattern of an antenna transmitting on each of the radio channels based on the comparisons, wherein the radiation pattern is expressed as a difference, for each of a plurality of azimuth angles, between a predicted antenna radiation pattern and the comparisons.

* * * * *